(No Model.) 8 Sheets—Sheet 1.

T. CARNEY.
CASH REGISTER.

No. 482,517. Patented Sept. 13, 1892.

Fig. 1

Witnesses
John L. Tunison
Martin H. Olsen

Inventor
Thomas Carney
By Edward Rector
his Atty.

(No Model.)

T. CARNEY.
CASH REGISTER.

No. 482,517. Patented Sept. 13, 1892.

Fig. 3

Witnesses
John L. Tunison
Martin H. Olsen

Inventor
Thomas Carney
By Edward Rector
his Atty.

(No Model.) 8 Sheets—Sheet 4.
T. CARNEY.
CASH REGISTER.

No. 482,517. Patented Sept. 13, 1892.

(No Model.) 8 Sheets—Sheet 7.

T. CARNEY.
CASH REGISTER.

No. 482,517. Patented Sept. 13, 1892.

Witnesses.
John L. Tunison
Martin H. Olsen.

Inventor
Thomas Carney
By, Edward Rector
his Atty.

(No Model.) 8 Sheets—Sheet 8.

T. CARNEY.
CASH REGISTER.

No. 482,517. Patented Sept. 13, 1892.

Witnesses
John L. Tunison
Martin H. Olsen

Inventor
Thomas Carney
By Edward Risto
His Atty.

UNITED STATES PATENT OFFICE.

THOMAS CARNEY, OF DAYTON, OHIO, ASSIGNOR TO THE NATIONAL CASH REGISTER COMPANY, OF SAME PLACE.

CASH-REGISTER.

SPECIFICATION forming part of Letters Patent No. 482,517, dated September 13, 1892.

Application filed May 23, 1892. Serial No. 434,001. (No model.)

*To all whom it may concern:*

Be it known that I, THOMAS CARNEY, a citizen of the United States, residing at Dayton, in the county of Montgomery and State of Ohio, have invented certain new and useful Improvements in Cash-Registers, of which the following is a description, reference being had to the accompanying drawings, forming part of this specification.

My invention relates, chiefly, to the registering mechanism of such machines; and it consists in novel constructions, combinations, and modes of operation of the parts, all as will be hereinafter set forth, and specifically pointed out in the claims.

In the accompanying drawings, Fig. 11, an enlarged detail of the revoluble shaft, the cams carried thereby, and the actuating-segments and pinions therefor; Fig. 12, a cross-section on the line 12 12 of Fig. 11, and Fig. 13 a corresponding view with the parts in the position they occupy at the opposite end of the stroke of the actuating-segment.

The operating-keys consist of levers A, strung upon a horizontal shaft B, extending across the lower forward part of the machine. There are thirty of these key-levers in the machine illustrated in the drawings, only twenty-seven of which, however, co-operate with the registering mechanism, the other three being odd keys employed for special purposes.

Figure 1:
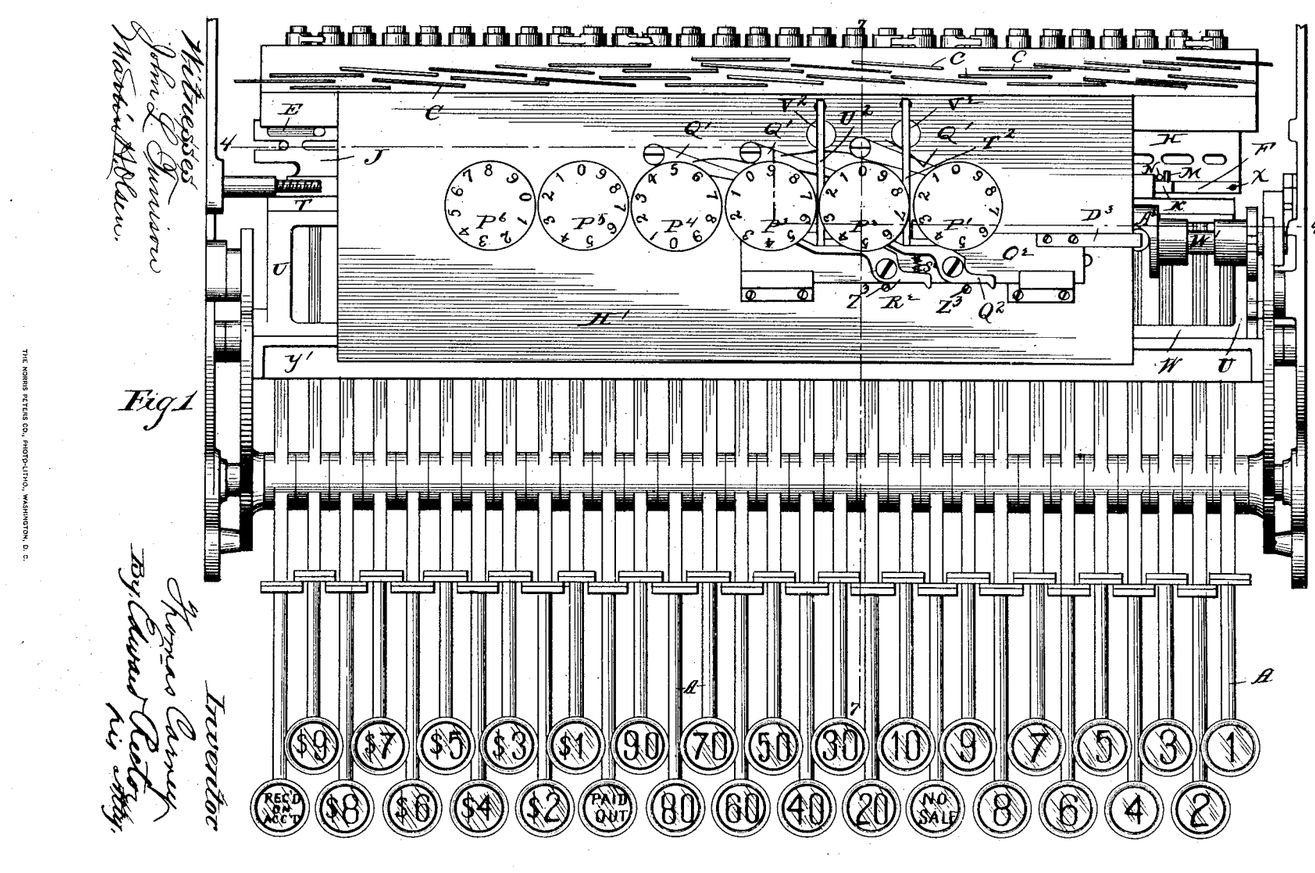
Figure 1 is a top plan view of the complete machine removed from the casing.
Figure 2:
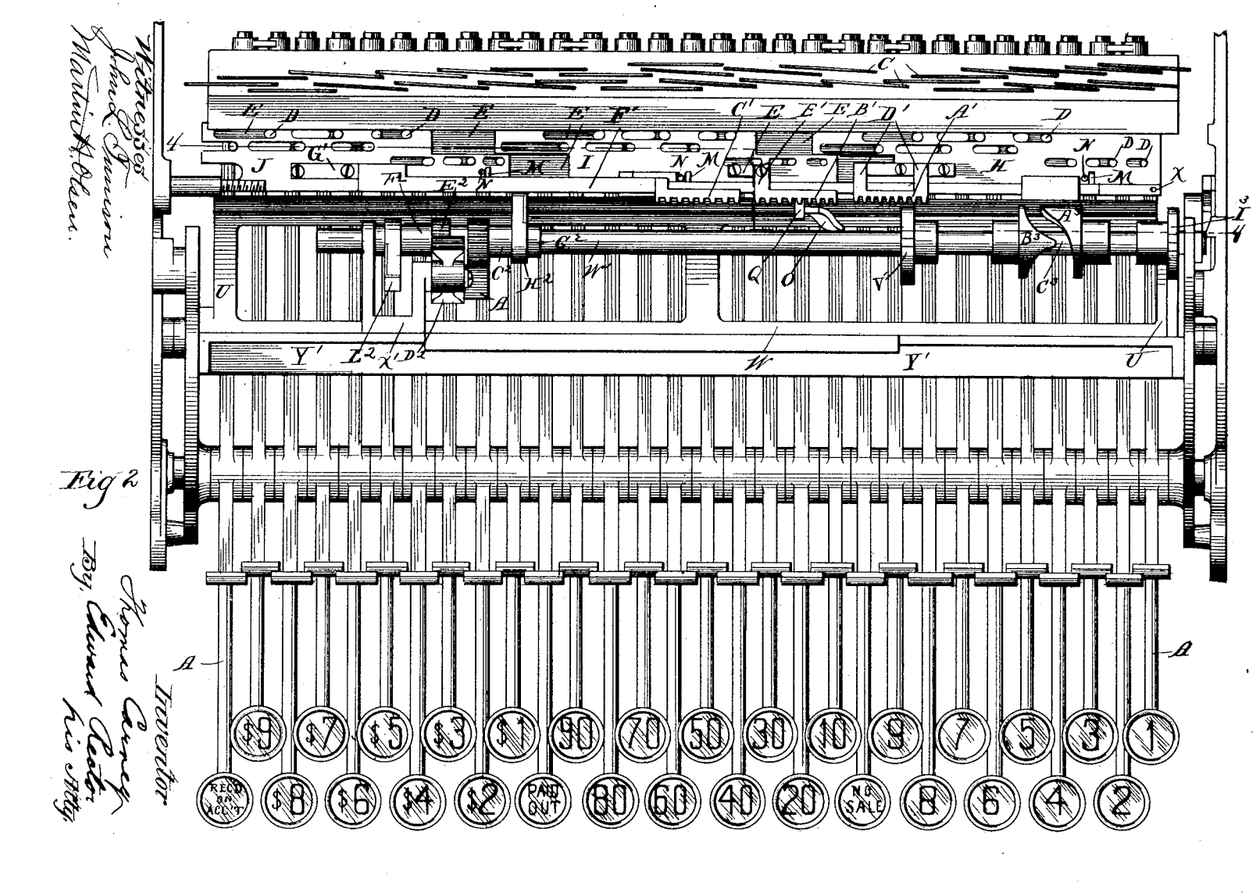
Fig. 2, a corresponding view with the top plate of the registering mechanism removed.

The twenty-seven keys which co-operate with the registering mechanism are divided into three sets, of nine keys each. The keys of the first set on the right represent units of cents from "1" to "9," and the finger-buttons on their front ends bear corresponding numbers, as seen in Figs. 1 and 2. The keys of the second set represent tens of cents from "10" to "90," and those of the third set units of dollars from "1" to "9." Resting upon the rear ends of the keys are a series of rods carrying the usual indicating-tablets C, one of which is lifted into view whenever the key upon which its rod rests is operated, as is usual in machines of this character.

Figure 4:
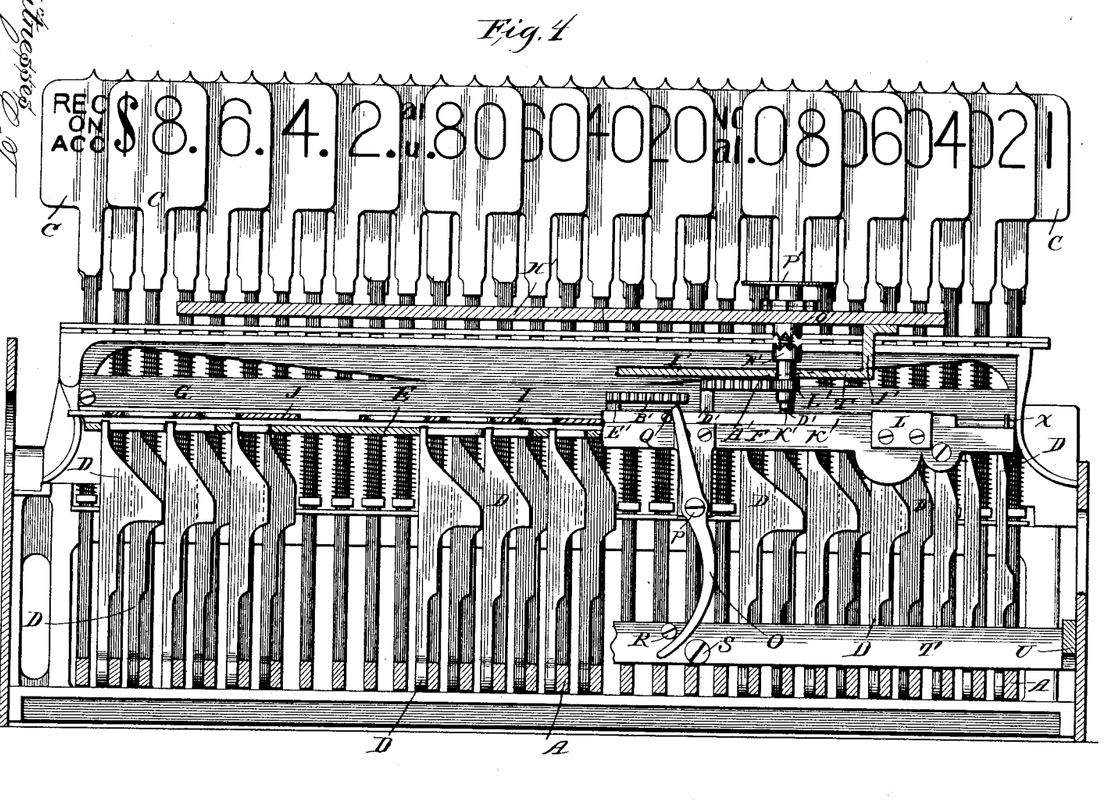
Fig. 4, a vertical cross-section of the machine, approximately on the line 4 4 of Fig. 1.

Each of the registering-keys (and in the following description the word "keys" may be understood to refer only to the registering-keys) has pivoted to its side, near its rear end, a vertical plate D, provided with an inclined cam-surface at its upper end. The upper edges of these cams are inclined outwardly and downwardly from the upper ends of the plates D and terminate at their lower ends in vertical edges, which extend a short distance below the inclined edges. These cams are adapted to play up and down in slots in a horizontal plate E of the framework extending from side to side of the machine, the respective slots in the plate E being, preferably, of exactly the same lengths as the widths of the cams which are to pass through them. (See Fig. 4.)

Figures 5, 6:
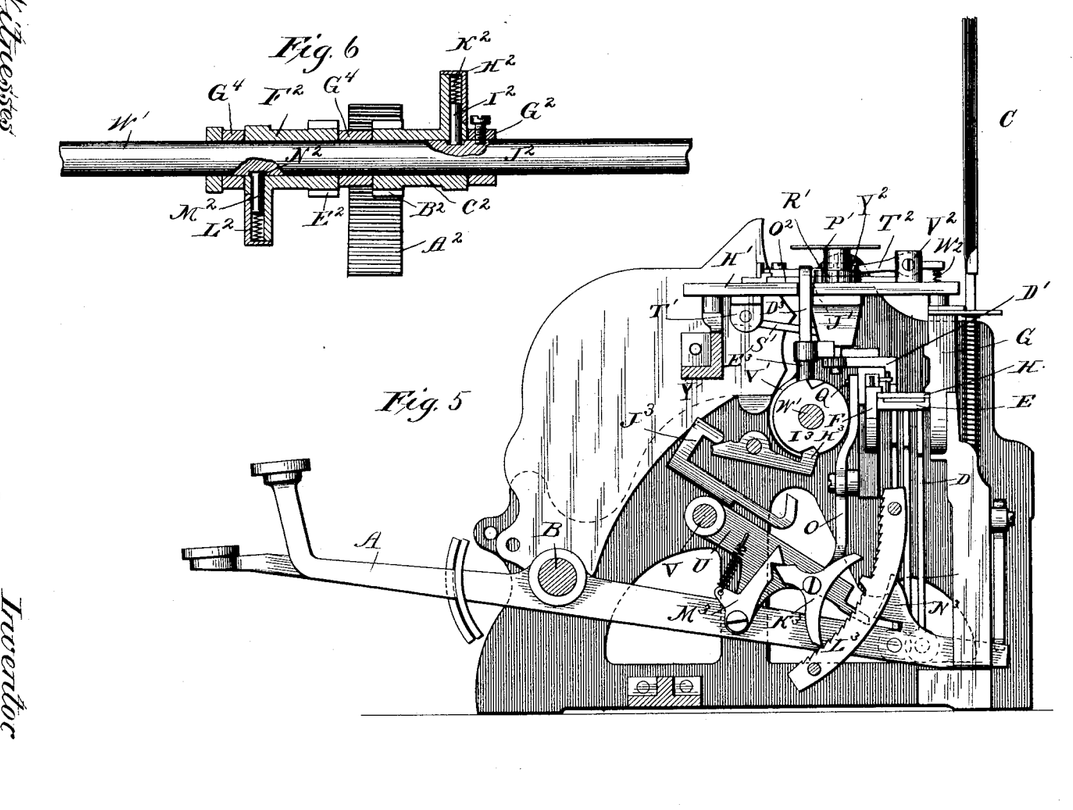
Fig. 5, a vertical section just within the right-hand-side frame, substantially an elevation of the right side of the machine with the frame removed.
Fig. 6, a detail view of the revoluble shaft and devices for turning the same.

Carried at their edges in horizontal grooves in supporting-plates F G, extending across the machine at each side of the plate E, are three sliding plates H, I, and J immediately above the plate E. The plate H is provided with a series of slots corresponding to the nine slots in the plate E, through which play the cam-plates carried by the nine keys in the first set, representing units of cents. The plate I is provided with a series of slots corresponding to the next nine slots in the plate E, and the plate J has nine slots corresponding to the third set of slots in the plate E. The slots in the plates H, I, and J are of exactly the same length as the corresponding slots in the plate E. When the plates H, I, and J are in their normal position, their slots do not coincide with the corresponding slots in the plate E, Fig. 4, but the respective slots overlap each other sufficiently to enable the pointed upper end of any cam-plate D to enter the right-hand end of the slot above it in the plate H, I, or J when said cam is lifted through its slot in the plate E. The lifting of the cam will force the plate H, I, or J to the right a distance proportionate to the width of the cam, and when the cam has been lifted to its limit of stroke and its lower vertical edge brought up into the slot in the sliding plate it will completely fill said slot and lock the plate from further movement. The widths of the cams are graduated in accordance with the amounts to be registered by the respective keys, the cams in each set gradually increasing in width from the units-key on the right to the nine-key on the left, the construction being such that when the front end of any key-lever is depressed and the cam-plate carried by it lifted the cam-plate will move the sliding bar with which it co-operates just far enough to add to the value of such key on the registering mechanism hereinafter described. The plates H I J are reset to normal position after they have been slid to the right by the operations of the keys by means of a sliding bar K, mounted to slide upon the upper edge of the bar F, being confined thereon by bracket-plates L, secured to the bar F. The bar K has projecting from its rear side three pins M, Fig. 2, and each of the plates H I J has a pin N, projecting upward from it immediately to the left of one of the pins M on the bar K. It results from this that whenever any one of said plates is slid to the right it will carry the bar K with it, and that when the bar K is slid to the left it will carry the sliding plate to the left with it. If two of the plates or all three of them be slid to the right at once, the return of the bar K to the left will carry them all back to normal position. The bar K is slid to the left at the end of each operation of the machine by a lever O, which is pivoted near its middle to the framework at P, Fig. 4, and whose end stands immediately to the right of a pin Q on the forward side of the bar K. The lower curved end of this lever is confined between two projections R S (in this instance a screw and a friction-roller carried on a second screw or stud) on a bar T, extending across all of the key-levers A and resting upon their upper sides near their rear ends. This bar constitutes part of what may be called a "vibrating frame," consisting of said bar, two side arms U, by which it is hung to the side frames of the machine at V, Figs. 5 and 7, and a second cross-bar W, connecting the forward ends of said side arms. When the front end of any key is depressed and its rear end elevated, the cross-bar T of the vibrating frame will be lifted with it and the lower end of the lever O thrown to the left and its upper end to the right. This will release the bar K and it will then be free to be slid to the right by any one of the plates H I J. When the operated key is released and its rear end and the cross-bar T drop back to normal position, the projection R on the bar will force the lower end of the lever O to the right and throw its upper end to the left, returning to normal position the bar K and the plate H, I, or J, which has been moved by the operation of the key. A pin X, projecting upward from the bar F, near its right-hand end, stands in the path of the bar K and limits the movement of the latter.

Each of the plates H I J carries a gear-toothed rack A' B' C', projecting forward over the bar K, Fig. 2. The rack A', carried by the plate H, is supported by an integral two-armed bracket D', secured upon the plate H near its left-hand end. The rack B' is supported upon the plate I by a single-armed bracket E', fastened to the upper side of the plate near its right-hand end, while the rack C', carried by the plate J, is supported upon the extreme right-hand end of a long bar F', mounted to slide above the bar K and fastened at its left-hand end to the upper side of the plate J at G'. In this manner all three of the racks are brought close together. The middle rack B' is located beneath the horizontal plane of the other two, Fig. 3, so that when the plate I is slid to the right by the operation of a key the rack B' can slide under the rack A', while the rack C' can slide over the rack B' when the plate J is slid to the right.

Figure 7:
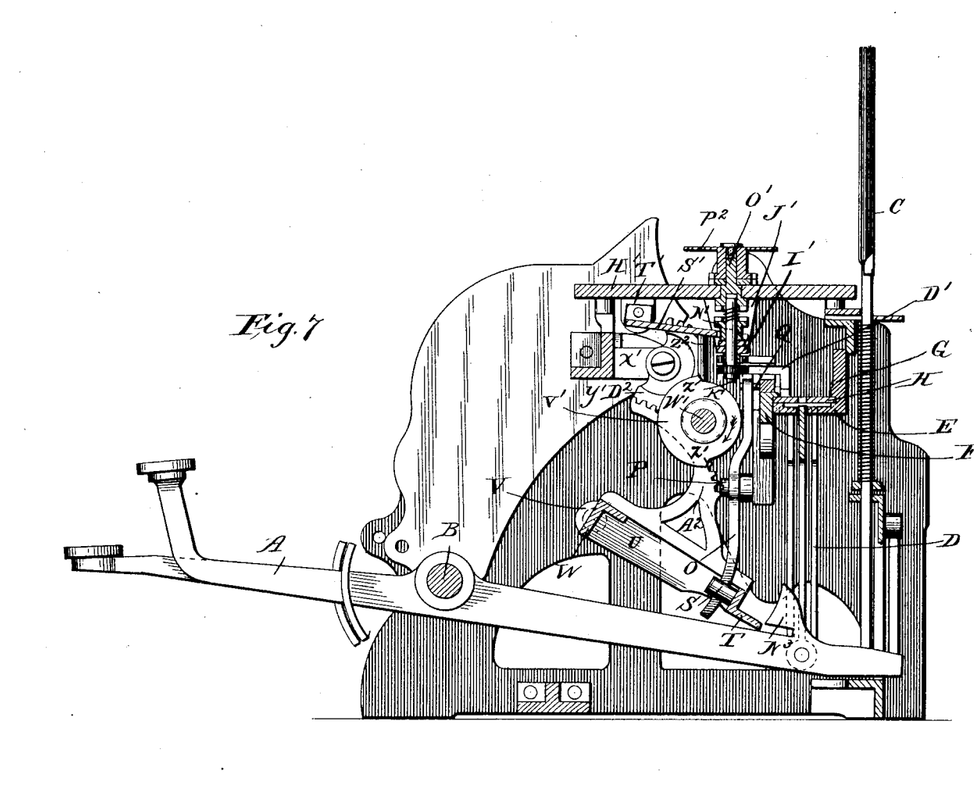
Fig. 7, a vertical section on the line 7 7 of Fig. 1, looking toward the left of the machine.
Figure 8:
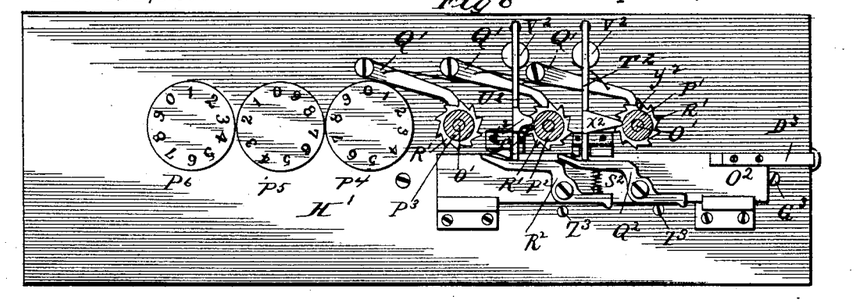
Fig. 8, a top plan view of the plate which carries the registering-wheels and the parts supported thereon, the first, second, and third registering-wheels being removed to expose the ratchets upon their spindles.

The registering-wheels, which are driven by the racks A' B' C' in the manner hereinafter described, are mounted on a horizontal plate H', supported upon the framework at the top of the machine. Journaled in a cross-bar I', supported at either end by brackets J' upon the under side of the plate H', Fig. 10, are three spindles K', Fig. 7. These spindles have secured upon their lower ends below the bar I' pinions L', which mesh with the respective racks A' B' C'. Immediately above the bar I' each spindle has fast upon it a collar M'. Feathered upon each spindle above its collar M' is a sliding clutch-collar N', whose teeth when the collar is lifted are adapted to become interlocked with clutch-teeth upon the base of a spindle O', journaled in the plate H', Fig. 7, and having fast upon its upper end above the plate H' one of the registering-wheels, whose hub rests upon the plate H'. The upper end of each spindle K' fits in a socket in the lower end of the spindle O' above it, as seen in Fig. 7. It results from this construction that when any clutch-collar N' is lifted into engagement with the clutch-teeth upon the base of the spindle O' above it and the plate whose rack meshes with the pinion fast on the spindle carrying such clutch-collar is slid to the right the registering-wheel will be turned a portion of a revolution proportionate to the extent of movement of the rack and plate. All of the clutch-collars N' are lifted into engagement with the clutch-teeth upon the spindles O' at the beginning of each operation of the machine by the means hereinafter described, so that during the positive strokes of the keys and the movements of the plates H I J by the cams D the registering-wheels will turn with the spindles K', whose pinions mesh with the racks carried by said plates. The clutch-collars are lowered at the end of the positive strokes of the keys, so that during the return movement of the plates and racks the registering-wheels will remain stationary, holding-pawls Q', spring-pressed into engagement with ratchets R' upon the hubs of the wheels, Figs. 8 and 9, preventing any backward movement of them.

Figure 3:
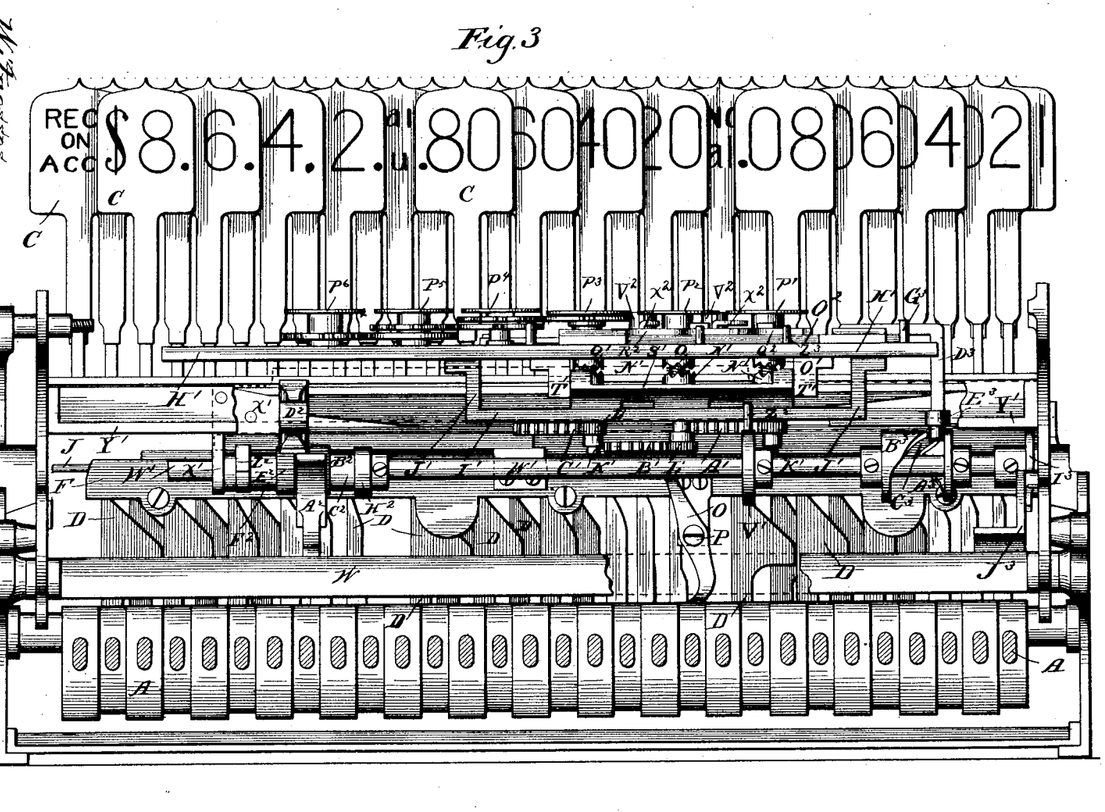
Fig. 3, a front elevation of the machine with the ends of the operating-keys cut off and part of the framework broken away.

The means for lifting the clutch-collars N' at the beginning of the positive strokes of the keys consist of a swinging plate S', hinged at its forward edge to ears T' upon the under side of the plate H' and slotted at its rear edge to embrace the reduced lower ends of the collars, Figs. 3, 7, and 10. When the rear edge of this plate is swung upward, all of the clutches will be engaged, and when it is released and drops back coiled springs U', surrounding the spindles K' between the collars N' and bases of the spindles O', will reset the collars N'. The plate S' is lifted at the beginning of each operation of the machine by a cam-disk V', Fig. 7, fast on a revoluble shaft W', journaled at its right-hand end in a bearing upon the side frame of the machine and at its left-hand end in a bracket X', secured upon the rear side of a cross bar Y' of the framework, Fig. 2. This shaft makes a complete revolution at each operation of the machine. One-half of the periphery of the disk V' is cut away, as shown, Fig. 7, forming two shoulders Z Z' at opposite sides of the same. A pin $Z^2$, depending from the under side of the plate S', rests upon the periphery of the cam-disk. When the latter is in its normal position, the pin $Z^2$ rests on the cut-away side of its periphery, immediately in rear of the shoulder Z. As the cam turns rearward at the beginning of an operation of the machine, the shoulder Z rides under and lifts the pin $Z^2$ and plate S' and throws all the clutches into engagement, and the raised portion of the periphery of the cam holds the plates S' up and all of the clutches in engagement until the disk has made one-half of a revolution and the pin $Z^2$ drops off the shoulder Z' onto the cut-away side of the disk again. The disk completes this half-revolution, and the plate S' is lowered and the clutches disengaged just after the positive stroke of the operated key or keys is completed, so that during the positive stroke of the keys the clutches are held in engagement to cause the registering-wheels to be turned, and during their return strokes the clutches are disengaged to permit the registering plates and racks to return to normal position without turning the registering-wheels.

The means for revolving the shaft W' may now be described. It consists of mechanism intermediate said shaft and the vibrating frame T U, heretofore described, by which the rising and falling reciprocating movement of the latter is converted into rotary motion in the former. This mechanism is shown in Figs. 2, 6, 7, 11, 12, and 13. The vibrating frame has secured upon it a curved rack $A^2$, concentric to its pivotal support at V. This rack is of sufficient width, Figs. 6 and 11, to mesh not only with a pinion $B^2$, carried by a sleeve $C^2$, loose on the shaft W', but also with a second segmental rack $D^2$, hung upon a stud projecting from the side of the bracket X', secured upon the rear side of the cross-bar Y' of the framework. The rack $D^2$ meshes with a pinion $E^2$, carried by a second sleeve $F^2$, also loose upon the shaft W'. The result of this direct gearing of the rack $A^2$ to the sleeve $C^2$ and its indirect gearing to the sleeve $F^2$ is that said sleeves are turned in opposite directions by the movements of the rack $A^2$, as indicated by the arrows in Figs. 11, 12, and 13. The sleeves $C^2$ $F^2$ are held in position on the shaft W' by the bracket X' at one end, a collar $G^2$, fast on the shaft at the other end, and spacing collars or sleeves, one interposed between the two sleeves and one between the sleeve $F^2$ and bracket X'. The sleeve $C^2$ has secured to or formed integral with it an arm or housing $H^2$, containing a pawl $I^2$, adapted to co-operate with a notch $J^2$ cut in the shaft W', a spring $K^2$, confined behind the pawl, pressing it against the shaft. The sleeve $F^2$ has a similar housing $L^2$, containing a spring-pressed pawl $M^2$, Fig. 6, adapted to co-operate with a second notch $N^2$ in the shaft on the opposite side of it from the notch $J^2$. When the parts are in their normal position of rest, as in Figs. 11 and 12, the housings $H^2 L^2$ stand on opposite sides of the shaft with the pawls $I^2$ $M^2$ engaged with the notches $J^2$ $N^2$. If the rack $A^2$ be now given a full stroke in the direction of the arrow in Fig. 12, it will turn the sleeve $C^2$ and housing $H^2$ a half-revolution and the pawl $I^2$ will carry the shaft W' with them, the parts assuming the position shown in Fig. 13. During this movement of the parts mentioned the sleeve $F^2$ and housing $L^2$ have been turned in the opposite direction a half-revolution, the pawl $M^2$ slipping out of the notch $N^2$ and traveling idly backward over the shaft and re-engaging said notch when the parts are brought to the position shown in Fig. 13, as shown in dotted lines in said figure. The shaft W', as before stated, has now been turned one-half of a revolution by the pawl $I^2$. When the rack $A^2$ is now moved back to the position shown in Fig. 12, the parts will reverse their movements above described and resume the positions shown in Fig. 12, and the pawl $M^2$ will carry the shaft around with it, thereby giving it the second half of its revolution. Upon the next forward stroke of the rack $A^2$ the pawl $I^2$ will turn the shaft another half-revolution, and upon the backward stroke of the rack the pawl $M^2$ will turn the shaft another half-revolution in the same direction, so that at each reciprocation of the rack forward and backward the shaft will be turned a complete revolution. The rack is reciprocated forward and back at each rise and fall of the vibrating frame, so that the shaft is given one complete revolution at each operation of the machine—one-half of a revolution during the positive stroke of a key and one-half during its negative stroke.

It is evident that the particular means employed for reciprocating the rack $A^2$ is immaterial to the operation of the parts and that the same device may be employed to convert reciprocating motion into rotary motion wherever such conversion is desirable. It will also be understood that the actuating-rack $A^2$ might be a straight one and reciprocate in right lines, instead of in the arc of a circle, where it was convenient or necessary to give it such movement.

Figure 9:
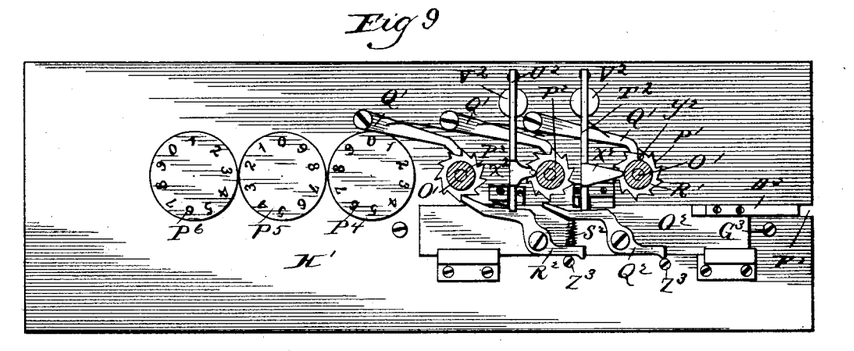
Fig. 9, a corresponding view with the parts in different position.
Figure 10:
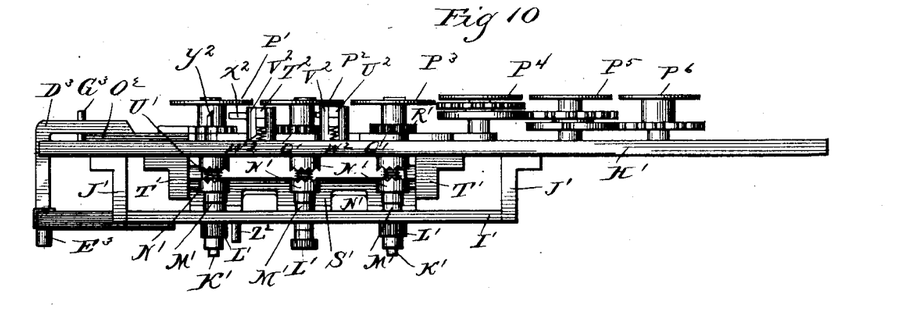
Fig. 10, a rear elevation of the registering-wheels, clutches, and some associated parts.

The transfer mechanism between the registering-wheels may be now described, reference being had, first, to Figs. 1, 8, 9, and 10. Mounted in guides upon the plate $H'$ is a sliding plate $O^2$, carrying two pawls $Q^2 R^2$, the former adapted to co-operate with the ratchet $R'$ on the spindle $O'$ of the wheel $P^2$ and the latter with the ratchet on the spindle of the wheel $P^3$. A spring $S^2$, interposed between the two pawls between their pivotal points, tends to throw them into position to engage their respective ratchets when the plate $O^2$ is slid to the left; but they are held in their normal positions by latches $T^2 U^2$. These latches consist of levers pivoted in slotted supports $V^2$ upon the top of the plate $H'$, springs $W^2$, interposed between the rear ends of the levers and the plate $H'$, Figs. 5 and 10, pressing the rear ends of the levers upward and holding their front ends down behind the pawls $Q^2 R^2$. Each of the latches is provided with a laterally-projecting plate $X^2$, extending into the path of travel of a pin or cam $Y^2$ upon the adjacent ratchet $R'$. When the ratchet and registering-wheel complete a revolution, the cam $Y^2$ will ride under the plate $X^2$ of the latch and lift the front end of the latter, thereby permitting the spring $S^2$ to throw the pawl into position to engage the ratchet of the next wheel to the left when the plate $O^2$ is slid in that direction. Thus with the parts in the position shown in Fig. 8, if the ratchet of the second registering-wheel $P^2$ be turned forward one or more notches its pin $Y^2$ will ride under the plate $X^2$, projecting from the latch $U^2$ and lift the front end of the latter, whereupon the spring $S^2$ will throw the left-hand end of the pawl $R^2$ rearward into position to co-operate with the ratchet of the third registering-wheel $P^3$. When the plate $O^2$ is then slid to the left, the pawl $R^2$ will engage the ratchet of said wheel, as seen in Fig. 9, and turn it one notch. Just as the plate $O^2$ reaches its limit of stroke to the left the rear end or heel of the pawl will strike a pin $Z^3$, projecting upward from the plate $H'$, and the opposite end of the pawl will be thrown out of engagement with the ratchet and the front end of the latch $U^2$ will drop down behind it again. The plate $O^2$, carrying the two pawls, is slid to the left and back to normal position again at each operation of the machine during the return stroke of the operated key or keys. Before it begins its movement to the left, therefore, the registering-wheels have been turned by the operated keys and the latches tripped and the pawls set for the necessary transfers. It will be noticed that in the normal position of the parts, Fig. 8, the point of the pawl $Q^2$ stands quite close to the ratchet of the second registering-wheel $P^2$, so that if its latch $T^2$ should be tripped by the completion of a revolution of the wheel $P'$ the pawl would engage the ratchet of the wheel $P^2$ at almost the beginning of the forward movement of the plate $O^2$, while the point of the pawl $R^2$ stands farther away from the ratchet of the third registering-wheel $P^3$, so that if its latch be tripped the pawl will not engage the ratchet of said wheel in the movement of the plate $O^2$ to the left until after the pawl $Q^2$ has engaged and turned the ratchet of the second registering-wheel. The purpose of this arrangement is to enable the complete revolution of the second wheel to be added upon the third wheel, even though such complete revolution of the second wheel be produced by a transfer from the primary wheel. Thus in Fig. 8 if the latch $T^2$ had been tripped by the primary wheel during the movement of the latter under the impulse of an operated key the pawl $Q^2$ would engage and turn the ratchet of the second wheel at the beginning of the movement of the plate $O^2$ toward the left. With the ratchet of the second wheel in the position shown in Fig. 8 this turning forward of it one notch by the pawl $Q^2$ would carry its pin $Y^2$ beneath the plate $X^2$ of the latch $U^2$, lifting the front end of the latter and permitting the spring $S^2$ to throw the pawl $R^2$ into position to engage the ratchet of the third wheel, so that in the further movement of the plate $O^2$ to the left said pawl would turn the third wheel and add upon it the complete revolution of the second wheel. The total of all the registrations is thus exhibited upon the registering-wheels at the end of each operation of the machine. The third wheel adds onto a fourth wheel $P^4$, the fourth onto a fifth $P^5$, and the fifth onto a sixth $P^6$ in the usual or any suitable manner.

Figures 11, 12, 13:
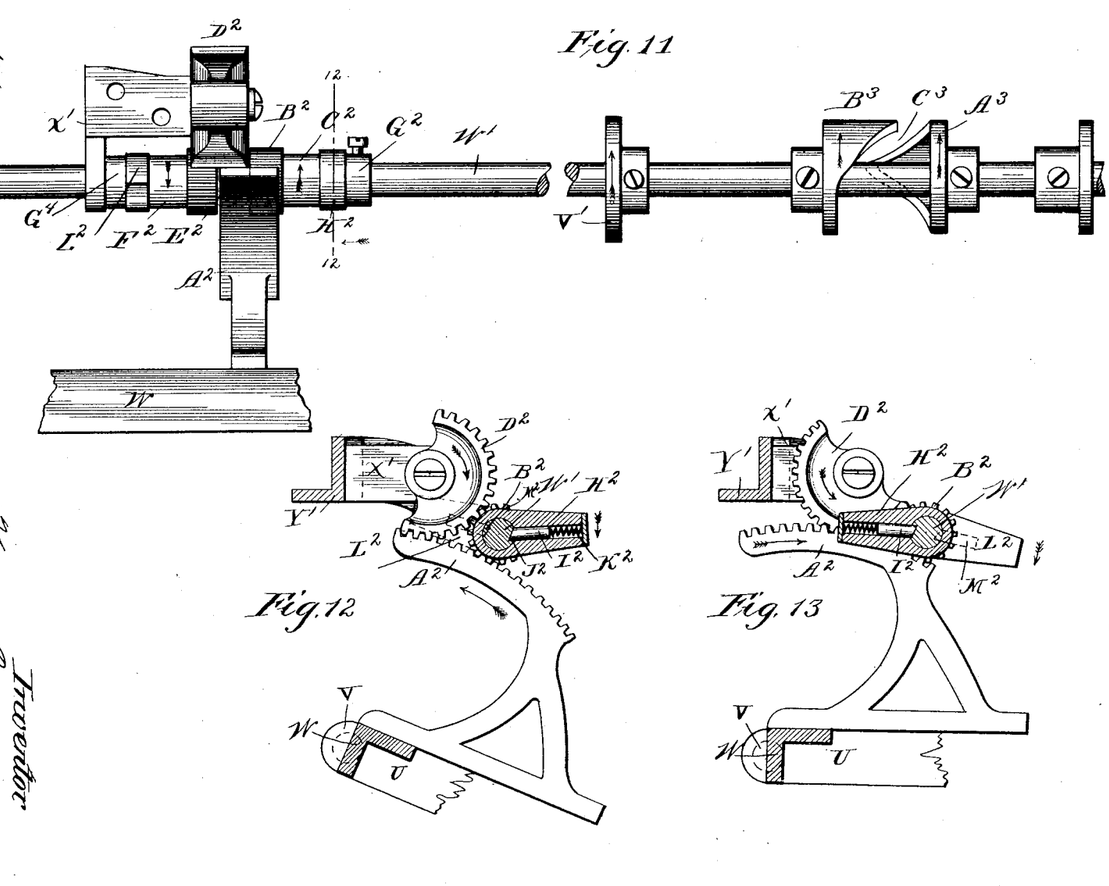

The means for reciprocating the plate $O^2$ back and forth at each operation of the machine consists of two cams $A^3 B^3$, Figs. 2, 3, and 11, fast on the shaft $W'$ near its right-hand end and forming a cam-groove $C^3$ between them on the rear side of the shaft. The plate $O^2$ has fastened to its right-hand end an arm D³, bent downward at right angles and carrying on its lower end a friction-roller E³, Figs. 3 and 10, which is confined between the cams A³ B³ and plays through the groove C³ between them when the shaft W' is revolved. The shapes of the cams A³ B³ and adjustment of the parts are such that during the positive stroke of a key and first half of the revolution of the shaft W' the friction-roller on the lower end of the arm D³ will not be engaged by either of the cams, and the plate O² will consequently remain at rest; but during the return stroke of the key and second half of revolution of the shaft W' the cam A³ will first engage the roller and force the plate O² to the left, and then the cam B³ will engage it and move the plate to the right to normal position. The vertical end of the arm D³ plays through a slot F³ in the plate H'. A pin G³ on the plate H' limits the movement of the plate O² to the right. A locking-dog H³, Fig. 5, pivoted to the right-hand side frame of the machine, co-operates with a notched disk I³, fast upon the right-hand end of the shaft W'. This dog is thrown into engagement with the two notches in the disk alternately by a bracket J³, carried by the vibrating frame heretofore described. In the normal position of the parts, Fig. 5, the forward end of the bracket engages the upper side of the forward end of the locking-dog and holds its rear end in engagement with one of the notches in the disk I³. When the vibrating frame is lifted by the operation of a key, the dog H³ is released and its rear end drops against the rising rear end of the bracket J³ and the disk and shaft are free to turn. Just as the positive stroke of the key is completed and the vibrating frame has been lifted to its highest position the rear end of the bracket J³ will carry the dog into engagement with the opposite notch in the disk, and thereby positively arrest and lock the shaft at the end of its half-revolution. When the operated key is released and the vibrating frame drops back to normal position, the dog H³ is released by rear end of the bracket J³ and the shaft and disk are free to complete their revolution. Just as the parts reach normal position the front end of the bracket re-engages the front end of the dog H³ and throws its rear end into engagement with the notch in the disk, thereby arresting and locking the shaft and disk at the end of their complete revolution. A double pawl K³, Fig. 5, pivoted to the side of the vibrating frame, co-operates with a curved ratchet-bar L³ and a latch M³ in the usual manner to insure a full stroke of the vibrating frame, and the keys are provided with hooks N³, which co-operate with a flange upon the rear side of said frame to couple the operated keys thereto as soon as they are displaced from normal position, as is common in machines of this character.

Having thus fully described my invention, I claim—

1. The combination of a longitudinally-sliding plate or bar provided with a series of slots extending lengthwise of it and a series of cams arranged to reciprocate through said slots so as to move the plate different distances and each adapted to fill the entire length of its co-operating slot when moved through it to positively arrest the plate when it has been moved the proper distance.

2. The combination of a longitudinally-sliding plate or bar provided with a series of slots extending lengthwise of it and a series of graduated cams arranged to reciprocate through said slots so as to move the plate different distances and each adapted to fill the entire length of its co-operating slot when moved through it to positively arrest the plate when it has been moved the proper distance.

3. The combination of a longitudinally-sliding plate or bar provided with a series of slots extending lengthwise of it and a series of vertically-guided cams arranged to reciprocate through said slots and move the bar different distances and each adapted to fill the entire length of its co-operating slot when moved through it to positively arrest the bar when it has been moved the proper distance.

4. The combination of a longitudinally-sliding plate or bar provided with a series of slots extending lengthwise of it and a series of vertically-guided graduated cams arranged to reciprocate through said slots and move the bar different distances and each adapted to fill the entire length of its co-operating slot when moved through it to positively arrest the bar when it has been moved the proper distance.

5. In a registering-machine, the combination of a longitudinally-sliding registering plate provided with a series of slots of different lengths extending lengthwise thereof and a series of graduated cams whose widths correspond to the lengths of the respective slots in the sliding plate, said cams being adapted to reciprocate through the slots in said plate so as to move the same different distances proportionate to the widths of the respective cams.

6. In a registering-machine, the combination of a longitudinally-sliding registering plate provided with a series of slots of different lengths, a series of key-levers representing different amounts, and a series of graduated cams whose widths correspond to the lengths of the respective slots in the sliding plate, said cams being adapted to be moved by the key-levers in defined paths through the slots in said plate, for the purpose described.

7. In a registering-machine, the combination of a longitudinally-sliding registering plate provided with a series of slots of different lengths, a series of key-levers representing different amounts, and a series of vertically-guided graduated cam-plates pivoted to the rear ends of said key-levers and adapted to be lifted by them through the slots in the sliding plate, for the purpose described.

8. In a registering-machine, the combination of a series of movable registering plates, each provided with a series of slots of different lengths, a series of sets of cams adapted to reciprocate through the slots in said plates so as to move the plates different distances, each cam being adapted to fill the entire length of its co-operating slot when moved through it, and thereby positively arrest the plate when it has been moved the proper distance, and a resetting-bar common to and co-operating with all of the plates to reset them when they have been moved by the cams.

9. In a registering-machine, the combination of a series of movable registering plates, each provided with a series of slots of different lengths, a series of sets of graduated cams adapted to reciprocate in defined paths through the slots in said plate, one set of cams for each plate, the widths of the cams in each set corresponding to the lengths of the slots in the plate with which they co-operate, and a resetting-bar common to and co-operating with all of the slotted plates to reset them after they have been moved by the cams.

10. In a registering-machine, the combination of a series of longitudinally-sliding registering plates, each provided with a series of slots of different lengths extending lengthwise of the plate, a series of sets of graduated cams, one set for each plate, adapted to reciprocate in defined paths through the slots in said plates and corresponding in widths to the lengths of the slots, and a longitudinally-sliding resetting-bar co-operating with all of the plates to reset them after being moved by the cams.

11. In a registering-machine, the combination of a series of longitudinally-sliding registering plates, each provided with a series of slots of different lengths extending lengthwise of the plate, a series of sets of key-levers, one set for each plate, a series of sets of graduated cams, one set for and operated by the keys of each set and adapted to reciprocate in defined paths through the slots in the plate corresponding to such set, a vibrating frame common to all of the keys of all of the sets and moved by the operation of any key, and a resetting-bar actuated by the vibrating frame and co-operating with all of the registering plates to reset them after they have been moved by the cams.

12. In a registering-machine, the combination of a longitudinally-sliding registering plate provided with a series of slots of different lengths extending lengthwise thereof, a series of graduated cams whose widths correspond to the lengths of the respective slots in the sliding plate, a series of operating-keys for moving the cams in defined paths through the slots in the sliding plate, a rack carried by said plate, a spindle having fast upon it a pinion meshing with the rack and having splined upon it a sliding clutch-collar, a registering-wheel carrying a set of clutch-teeth adapted to co-operate with those on the sliding clutch-collar, and means for moving the clutch-collar into engagement with the clutch-teeth of the registering-wheel at the beginning of the strokes of the keys in one direction and disengaging it therefrom at the ends of said strokes.

13. The combination of a rotary shaft, a pinion loose upon said shaft, a pawl movable with the pinion and adapted to engage a notch in the shaft, a second pinion loose on said shaft, and a pawl movable therewith and adapted to engage a notch in the shaft, a reciprocating rack meshing with the first pinion, and a second rack intermediate said first rack and the second pinion, for the purpose described.

14. The combination of a rotary shaft, a sleeve loose thereon and carrying a pinion, and a housing containing a pawl adapted to engage a notch in the shaft, a second sleeve loose upon the shaft and carrying a second pinion, and a housing containing a second pawl, adapted to engage a notch in the shaft, a reciprocating rack meshing with the first pinion, and a second rack meshing with the first rack and with the second pinion, for the purpose described.

15. The combination of a rotary shaft, a pinion loose thereon, a pawl movable with the pinion and adapted to engage a notch in the shaft, a second pinion loose on said shaft, and a pawl movable therewith and adapted to engage a notch in the shaft, a series of operating-keys, a vibrating frame common to said keys and moved by the operation of any one of them, a rack carried by said frame and meshing with the first-mentioned pinion, and a second rack intermediate the first rack and the second pinion, substantially as and for the purpose described.

16. The combination of the registering-wheels $P'$ and $P^2$, the ratchet $R'$, carried by the wheel $P^2$, the sliding plate $O^2$, carrying the pawl $Q^2$, and the latch $T^2$, co-operating with the pawl $Q^2$ and with a cam carried by the wheel $P'$, whereby at each complete revolution of the wheel $P'$ the latch is tripped and the pawl $Q^2$ set to engage the ratchet of the wheel $P^2$ when the plate $O^2$ is slid to the left, substantially as and for the purpose described.

17. The combination of the registering-wheels $P'$, $P^2$, and $P^3$, the ratchets $R'$, carried by the wheels $P^2$ and $P^3$, the sliding plate $O^2$, carrying the pawls $Q^2$ and $R^2$, the former adapted to co-operate with the ratchet of the wheel $P^2$ and the latter with the ratchet of the wheel $P^3$, the spring $S^2$, the latches $T^2$ $U^2$, co-operating, respectively, with the pawls $Q^2$ $R^2$ and with cams carried by the wheels $P'$ and $P^2$, and the pins $Z^3$ for disengaging the pawls from the ratchets, substantially as and for the purpose described.

18. The combination of the registering-wheels $P'$, $P^2$, and $P^3$, the ratchets $R'$, carried by the wheels $P^2$ and $P^3$, the sliding plate $O^2$, carrying the pawls $Q^2$ and $R^2$, the former adapted to co-operate with the ratchet of the wheel $P^2$ and the latter with the ratchet of the wheel $P^3$, the spring $S^2$, the latches $T^2$ $U^2$, co-operating, respectively, with the pawls $Q^2$ $R^2$ and with cams carried by the wheels $P'$ $P^2$, the revoluble shaft $W'$, and the cams $A^3$ $B^3$, fast thereon and co-operating with the arm $D^3$, depending from the sliding plate $O^2$, substantially as described.

19. The combination of the key-levers A, the vertically-guided cam-plates D, carried by their rear ends, and the sliding registering plates provided with longitudinal slots corresponding in length to the widths of the respective cams, substantially as and for the purpose described.

20. The combination of the key-levers A, the vertically-guided cam-plates D, carried by their rear ends, the sliding registering plates provided with slots corresponding in lengths to the widths of the respective cams, the resetting-bar K, co-operating with the registering plates, the vibrating bar T, extending across the keys, and the lever O, co-operating with said bar and with the resetting-bar K, substantially as described.

21. The combination of the key-levers A, the vertically-guided cam-plates D, carried by their rear ends, the sliding registering plates provided with slots corresponding in lengths to the widths of the respective cams, the racks carried by the sliding plates, the spindles $K'$, carrying pinions meshing with said racks, the sliding clutch-collars feathered upon said spindles, the registering-wheels carrying clutch-teeth adapted to co-operate with those on the sliding collars, the swinging plate $S'$ for lifting the clutches, and the revoluble shaft $W'$, carrying a cam co-operating with the plate to lift the same and engage the clutches, substantially as described.

22. The combination of the rotary shaft $W'$, the sleeve $C^2$, loose thereon, the pinion $B^2$ and housing $H^2$, fast on said sleeve, the latter containing the pawl $I^2$, adapted to engage the notch $J^2$ in the shaft $W'$, the sleeve $F^2$, loose on the shaft $W'$, the pinion $E^2$ and housing $L^2$, fast on said sleeve, the latter containing the pawl $M^2$, adapted to engage the notch $N^2$ in the shaft $W'$, the reciprocating rack $A^2$, meshing with the pinion $B^2$, and a second rack $D^2$, intermediate the rack $A^2$ and pinion $E^2$, substantially as and for the purpose described.

23. The combination of the rotary shaft $W'$, the notched disk $I^3$, fast thereon, the locking-dog $H^3$, co-operating with said disk, the key-levers A, the vibrating frame lifted by said levers, and the bracket $J^3$, carried by said frame and co-operating with the dog $H^3$, in the manner and for the purpose described.

THOMAS CARNEY.

Witnesses:
F. A. L. SNECKNER,
PEARL N. SIGLER.